Nov. 1, 1966 J. S. MAZZA 3,283,156
NUCLEAR RADIATION SHIELDING WINDOW
Filed March 12, 1963
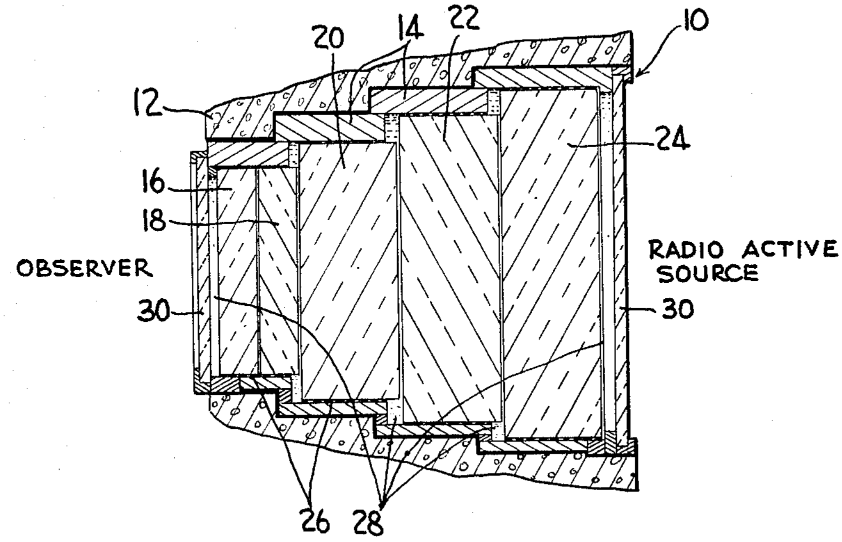
INVENTOR.
JOSEPH S. MAZZA
BY
Oscar L. Spencer
ATTORNEY United States Patent Office 3,283,156
Patented Nov. 1, 1966

3,283,156
NUCLEAR RADIATION SHIELDING WINDOW

Joseph S. Mazza, Pittsburgh, Pa., assignor to Pittsburgh Plate Glass Company, Pittsburgh, Pa., a corporation of Pennsylvania Filed Mar. 12, 1963, Ser. No. 264,528
5 Claims. (Cl. 250—108)

This invention relates generally to radiation shielding windows of the type frequently employed at atomic energy and like installations.

Specifically, this invention is concerned with improved radiation shielding windows having a slab of cerium modified, soda-lime-silica glass possessing the inherent properties of relatively low electrical resistivity and relatively high resistance to discoloration on exposure to irradiation.

Radiation shielding has become increasingly important in recent years with the advent of the age of atomic energy and the more frequent use of higher levels of radiation in this and other areas of scientific endeavor. One form of shielding which is frequently used where direct observation of the radioactive area is desirable is a radiation shielding window comprised of specially formulated glass plates and slabs.

For the purpose of this invention, "glass slab" refers to a relatively thick piece of glass (e.g., 4–10 inches) which, prior to this invention, was provided primarily for its inherent radiation shielding property whereas "glass plate" refers to a relatively thin piece of glass which is provided for properties other than that of radiation shielding. "Plate glass," on the other hand, has reference to a known soda-lime-silica glass composition.

A typical radiation shielding window consists of one or more relatively thick slabs of glass, having a high lead composition, to provide the required radiation shielding. The glass slabs are mounted sequentially in an open-ended enclosure or housing. Glass cover plates, approximately one inch thick, are usually provided to close each end of the open-ended housing. Where glass cover plates or more than one glass slab is used, the glasses are generally separated by a relatively thin layer of oil having an index of refraction approximating that of the glasses used. The glass cover plates are provided to protect the enclosed glass slabs and contain the oil within the housing. The glass cover plates are not primarily intended to provide radiation shielding.

The glasses which are used in radiation shielding observation windows must be of good quality, essentially free from bubbles, seed, or striae, and have very little intrinsic color to permit unimpaired viewing of the work in the radioactive area. In addition, observation is enhanced by using glasses which are highly resistant to discoloration by nuclear or short wave length radiation. It is desirable that the glasses used in radiation shielding windows possess the property of good chemical durability. The thick glass slabs used in the shielding window must also be of sufficient density to provide adequate radiation protection for the observer.

Lead glasses possessing the above-mentioned characteristics are presently available for use in radiation shielding windows exposed to irradiation levels below $10^5$ roentgens. It has been discovered, however, that lead glasses will not provide an entirely satisfactory radiation shielding window where operations are conducted in a zone of high radiation, i.e., higher than $10^5$ roentgens.

Glass fracture has occurred in existing types of radiation shielding windows when exposed to high level irradiation. This failure has consistently occurred in the 8 to 10 inch thick slab of high density (3.3 grams per cubic centimeter) lead glass nearest the radioactive source. Breakage originates interiorly in a plane approximately 4 inches from the source side (not including the approximately 1 inch thick cover plate).

It has been theorized that in glasses having a high electrical resistivity (i.e., low electrical conductivity) such as lead glasses, the charge separation produced by Compton effect under irradiation does not readily dissipate and can eventually reach a level where electrical breakdown occurs, fracturing the glass in a plane roughly corresponding to that of maximum charge.

High density lead glasses of the kind used in existing types of radiation shielding windows have a volume resistivity, herein referred to simply as resistivity, in the range of $10^{16}$ to $10^{18}$ ohm centimeters. Precise measurements of the resistivity of lead glasses are not presently available, primarily due to the inherent limitations of existing measuring techniques. Nevertheless, it is known that the resistivity of lead glasses is substantially higher than that of plate and other glasses which are amenable to precise measurement. Table I below lists several examples of lead glasses used in radiation shielding windows, along with their compositions and certain of their properties. The glasses were prepared in the manner disclosed in U.S. Letters Patent 3,046,148 to Earl T. Middleswarth et al. The proportions of the ingredients are set forth in percent by weight.

TABLE I

| Composition | 1 | 2 | 3 |
|---|---|---|---|
| $SiO_2$ | 45.1 | 50.5 | 48.5 |
| PbO | 31.3 | 31.5 | 35.5 |
| $K_2O$ | 20.0 | 15.2 | 13.2 |
| $CeO_2$ | 1.7 | 1.8 | 1.8 |
| F | 0.9 | 0.9 | 0.9 |
| $Na_2O$ | ---- | 0.5 | 0.5 |
| CaO | 1.4 | ---- | ---- |
| Total | 100.4 | 100.4 | 100.4 |
| Less oxygen correction for fluorine | −0.4 | −0.4 | −0.4 |
| Corrected total | 100.0 | 100.0 | 100.0 |
| Density, grams per cubic centimeter | 3.24 | 3.18 | 3.29 |
| Percent luminous transmittance for illuminant "A" (glass thickness of one inch) | 87.6 | 88.4 | 87.3 |
| Volume resistivity, ohm-centimeter | $10^{16}$–$10^{18}$ | $10^{16}$–$10^{18}$ | $10^{16}$–$10^{18}$ |

Experiments with glasses having relatively low resistivity indicate that the charge induced in these glasses is dissipated rapidly enough to eliminate electrical discharge fracture.

One such glass which has been found to possess the desired electrical properties for fracture resistance is a soda-lime-silica glass of a composition substantially approximating that of conventional plate glass.

It is known that the conductivity of glass tends to rise and its reciprocal, resistivity, tends to drop with an increase of the soda content of the glass. Also, the introduction of certain other modifying ions into the structure has a known tendency to reduce the mobility of the sodium ions.

Conventional soda-lime-silica glass, having a high soda content, has not heretofore been used in shielding slabs because of its inherently low shielding power and the fact that exposure to irradiation causes it to discolor. Browning, as radiation induced discoloring is called, can be minimized by the addition of about 0.5 to 4 percent by weight of cerium to the basic soda-lime-silica composition. Prior to the present invention, it had not been considered to use a slab composed of a soda-lime-silica glass composition, in radiation shielding windows, exclusively for its electrical properties. Also, there was still to be determined what effect the addition of the modifying cerium would have on the electrical properties of a basic soda-lime-silica glass composition.

It is therefore an object of this invention to produce a glass slab, for use in radiation shielding windows, having low electrical resistivity and high resistance to discoloration from irradiation.

It is also an object of this invention to produce a radiation shielding window which is not subject to failure from dielectric breakdown as the result of high level irradiation.

It is a further object of this invention to produce a radiation shielding window in which the glass slab nearest the radiation source (exclusive of the cover plate) possesses the characteristics of relatively low electrical resistivity and high resistance to browning or discoloration from irradiation.

These and other objects of the invention will become more apparent during the course of the following description when taken in connection with the accompanying drawing.

In the drawing, a sectional view is shown of a typical radiation shielding window within the contemplation of the present invention.

In accordance with the present invention, glasses having a relatively low electrical resistivity and high resistance to browning have been produced and tested successfully at high levels of radiation. Examples of these and other glasses having a relatively low resistivity and certain of their properties are set forth in Table II, where the proportions of the ingredients are set forth in percent by weight.

The preferred glass produced in accordance with the invention (composition 2, in Table II) is made from conventional batch ingredients which include sand, soda ash, sodium nitrate, calcium carbonate, cerium oxalate, salt cake and common salt. The batch ingredients are thoroughly mixed in proportions necessary to produce the preferred glass of the invention. Various sized pots or crucibles can be employed and the temperatures and times of melting will vary according to the amounts being formed.

The following presents a mixture of the batch ingredients which can be used to prepare this preferred glass composition.

| Ingredient: | Parts by weight |
|---|---|
| Sand | 1000 |
| Soda ash | 314 |
| Calcium carbonate | 325 |
| Sodium nitrate | 50 |
| Cerium oxalate | 52½ |
| Salt cake | 10 |
| Common salt | 25 |

The temperatures and melting conditions herein recited are employed to make about 12 pounds of glass in a small pot in a furnace heated by the controlled combustion of natural gas or in an electric furnace heated by globars. The empty pot is pre-heated in a furnace at a furnace temperature of about 2300° F. A portion of the

TABLE II

| Composition | Plate Glass | Cover Plate | Cerium modified soda-lime-silica compositions | |
|---|---|---|---|---|
| | | | 1 | 2 |
| $SiO_2$ | 70.5 | 63.79 | 69.51 | 69.5 |
| $BaO$ | ---------- | 15.00 | ---------- | ---------- |
| $K_2O$ | ---------- | 9.02 | ---------- | ---------- |
| $Na_2O$ | 12.88 | 6.42 | 14.40 | 14.4 |
| $CaO$ | 11.89 | ---------- | 11.13 | 12.6 |
| $B_2O_3$ | ---------- | 3.18 | ---------- | ---------- |
| $CeO_2$ | ---------- | 1.78 | 3.44 | 1.8 |
| $MgO$ | 2.51 | ---------- | ---------- | ---------- |
| $NaCl$ | 0.04 | ---------- | 0.83 | 0.8 |
| F | ---------- | 0.62 | ---------- | ---------- |
| $Na_2SO_4$ | 0.75 | 0.32 | 0.69 | 0.7 |
| $Al_2O_3$ | 0.14 | 0.11 | ---------- | 0.2 |
| $Fe_2O_3$ | 1.29 | 0.01 | ---------- | ---------- |
| Total | 100.00 | 100.25 | 100.00 | 100.0 |
| Less oxygen correction | ---------- | -.25 | ---------- | ---------- |
| Corrected total | ---------- | 100.00 | ---------- | ---------- |
| Density, grams per cubic centimeter | 2.5 | 2.7 | 2.5 | 2.5 |
| Percent luminous transmittance for illuminant "A," before irradiation (glass thickness of one inch) | 86.0 | 89.7 | 74.6 | 84.1 |
| Percent luminous transmittance, two weeks after $0.97\times10^7$ roentgens Cobalt-60 irradiation | ---------- | ---------- | ---------- | 81.6 |
| Volume resistivity, ohm-centimeter at 100° C. | $5.44\times10^{10}$ | $1.08\times10^{14}$ | $1.72\times10^{10}$ | $4.22\times10^{10}$ |

The preferred glass of the present invention is indicated as composition 2 in Table II, above. The glass of composition 1, it will be noted, is substantially the same in composition as the preferred glass except for the addition of larger amounts of cerium. The additional cerium produces a strong intrinsic color in the glass which adversely affects its luminous transmittance, as will be recognized by a comparison of the transmittance property for the two glasses. However, the resistivities of compositions 1 and 2 are substantially the same, i.e., in the range of $10^{10}$ to $10^{11}$ ohm-centimeters.

It will also be noted from a comparison of the figures for plate glass with that of compositions 1 and 2 that the addition of the modifying cerium has no appreciable effect on the resistivity of a basic soda-lime-silica composition.

The luminous transmittance figures for composition 2, before and after irradiation, indicates that the addition of cerium to the composition effectively minimizes browning or radiation induced discoloring.

thoroughly mixed batch is ladled into the pre-heated pot and the temperature of the furnace is gradually increased. Over a period of about 2¼ hours the remaining portion of the mixed batch is ladled into the pot and the temperature is increased gradually to about 2650° F. The temperature of 2650° F. is maintained for about 3 hours, during which time the glass making materials are melted, the chemical reactions are completed, the molten glass is mechanically stirred and the glass becomes substantially free of bubbles.

After the glass has become substantially free of bubbles, the temperature of the furnace is lowered in about one-half of an hour to about 2400° F., during which time the glass is also continuously stirred, but at a lower speed than that employed at the higher temperature. When the furnace temperature reaches 2400° F., stirring of the glass is discontinued, the stirring mechanism is withdrawn slowly from the molten glass and the furnace temperature is further reduced in about one-half of an hour to about 2300° F. The pot of glass is then removed from the furnace and the glass is poured out into a preheated metal mold to form a slab of desired thickness. The slab is then placed in a kiln and cooled from about 1100° F. to about 850° F. at the rate of 5° F. per minute. Thereafter, the glass is cooled more rapidly to room temperature and may be ground and polished according to conventional manufacturing processes.

It is to be understood that smaller or larger pots or crucibles may be employed to form smaller or larger quantities of the glass. In these cases, slightly different temperatures and time intervals may be employed, for example, the length of time of melting will be longer as larger pots are employed to melt larger quantities of the glass.

The results tabulated in Table II indicate that a cerium modified soda-lime-silica glass composition can be produced having a resistivity in the range of $10^{10}$ to $10^{11}$ ohm-centimeters, as compared to a range of $10^{16}$ to $10^{18}$ ohm-centimeters for the lead glass compositions of Table I. Thus, the resistivity of the lead glass is $10^5$ to $10^8$ times greater than the resistivity of the cerium modified soda-lime-silica glass composition. On a relative scale the appreciably lower resistivity of the cerium modified soda-lime-silica glass composition makes it particularly desirable for applications requiring this electrical property. One such application is in radiation shielding windows where glass failure occurs as a result of dielectric breakdown.

A soda-lime-silica glass, within the contemplation of this invention, has the following composition:

| Ingredient: | Percent by weight |
|---|---|
| $SiO_2$ | 65 to 75 |
| $Na_2O$ | 10 to 15 |
| CaO | 5 to 15 |
| $K_2O$ | 0 to 5 |
| MgO | 0 to 10 |
| $B_2O_3$ | 0 to 5 |
| $Al_2O_3$ | 0 to 5 |

In FIG. 1 is shown a typical radiation shielding window contemplated by the present invention. The radiation shielding window 10 is essentially a unitary structure mounted in a thick concrete wall 12 of a suitable enclosure which separates and protects an observer from the radioactive source. The shielding window 10 is comprised of a metal housing or enclosure 14 which is constructed to be open at both ends. Mounted or supported within the housing are thick glass slabs represented by reference numerals 16, 18, 20, 22 and 24 respectively. Glass cover plates 30 are provided to enclose each end of the open-ended housing 14. Each of the glass slabs is surrounded by a layer or sheet of lead 26 and the glasses are separated by oil 28 having an index of refraction approximating that of the adjacent glasses.

Prior to the present invention, one or more thick glass slabs, 16 to 24, of a high lead composition and characteristically high density, were provided to protect the observer from the radiation source. However, because of the occurrence of fracture induced by dielectric breakdown in the glass slab 24 nearest the radiation source (exclusive of the cover plate) it is now proposed by the present invention to replace glass slab 24 with a cerium modified soda-lime-silica glass of a composition approximating that of composition 2, in Table II above. The use of the relatively low resistivity, cerium modified soda-lime-silica composition for glass slab 24 is primarily for the purpose of preventing glass fracture due to dielectric breakdown and not for shielding.

It is to be understood that the present invention contemplates the use of a single glass slab, having a relatively low electrical resistivity and high resistance to discoloring, or a glass slab as described immediately above in combination with other glass slabs of the same or different electrical properties or either of the above two arrangements in combination with cover plates.

Radiation shielding slabs constructed in accordance with the present invention have been subjected to a radiation dose of as high as $5\times10^8$ roentgens (cobalt 60-gamma) without fracture while conventional lead-glass slabs broke somewhere between $10^5$ and $10^8$ roentgens.

Although the present invention has been described with respect to specific details of certain embodiments thereof, it is not intended that such details act as limitations upon the scope of the invention except insofar as included in the accompanying claims.

I claim:

1. In a radiation shielding window, a slab of non-browning glass of from 4 to about 10 inches thick having a volume resistivity of less than about $10^{11}$ ohm-centimeters at a temperature of 100° centigrade.

2. A radiation shielding window comprising mounting means and a slab of glass of from 4 to about 10 inches thick, said glass having a volume resistivity of less than about $10^{11}$ ohm-centimeters at a temperature of 100° centigrade and containing cerium oxide in an amount sufficient to resist browning of the glass when exposed to high energy radiation but not provide an objectionable intrinsic color to the glass.

3. A radiation shielding window comprised of a slab of glass of from 4 to about 10 inches thick, said glass being a soda-lime-silica glass containing cerium oxide in an amount sufficient to reduce browning of the glass when exposed to high energy radiation but not provide an objectionable intrinsic color to the glass and wherein the glass consists of the following ingredients in percent by weight: 65 to 75 percent $SiO_2$, 10 to 15 percent $Na_2O$, 5 to 15 percent CaO, 0 to 5 percent $K_2O$, 0 to 10 percent MgO, 0 to 5 percent $B_2O_3$, 0 to 5 percent $Al_2O_3$ and 0.5 to 4 percent $CeO_2$.

4. A radiation shielding window comprised of a slab of glass of from 4 to about 10 inches thick having the following approximate composition in percent by weight: 69.5 percent $SiO_2$, 14.4 percent $Na_2O$, 12.6 percent CaO, 1.8 percent $CeO_2$, 0.8 percent NaCl, 0.7 percent $Na_2SO_4$ and 0.2 percent $Al_2O_3$.

5. A radiation shielding window comprised of slabs of glass of from 4 to about 10 inches thick, at least one of the slabs of glass being composed of a lead glass consisting essentially of the following ingredients in percent by weight: 42 to 51 percent $SiO_2$, 30 to 38 percent PbO, 12 to 22 percent $K_2O$, 0.3 to 2 percent F, 0.5 to 3 percent $CeO_2$, 0 to 2 percent CaO and 0 to 1.5 percent $Na_2O$, and at least one of the slabs being a soda-lime-silica glass containing cerium oxide in an amount sufficient to resist browning of the glass when exposed to high energy radiation but not provide an objectionable intrinsic color to the glass, said lead glass having a substantially greater volume resistivity than said soda-lime-silica glass.

References Cited by the Examiner

UNITED STATES PATENTS

| | | | |
|---|---|---|---|
| 2,223,118 | 11/1940 | Miller | 250—108 |
| 2,747,105 | 5/1956 | Fitzgerald et al. | 250—108 |
| 2,957,210 | 10/1960 | Levenson | 250—108 X |
| 3,017,279 | 1/1962 | Van Dolah et al. | 106—52 X |
| 3,173,850 | 3/1965 | Hood | 106—52 X |

RALPH G. NILSON, *Primary Examiner.*

ARCHIE R. BORCHELT, *Examiner.*